US010599379B2

(12) United States Patent
Ou

(10) Patent No.: US 10,599,379 B2
(45) Date of Patent: *Mar. 24, 2020

(54) METHOD AND SYSTEM FOR PRESENTING INFORMATION

(71) Applicant: Alibaba Group Holding Limited, George Town (KY)

(72) Inventor: Zhou Ou, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,986

(22) Filed: Oct. 10, 2018

(65) Prior Publication Data

US 2019/0129677 A1 May 2, 2019

Related U.S. Application Data

(63) Continuation of application No. 14/833,473, filed on Aug. 24, 2015, now Pat. No. 10,140,081.

(30) Foreign Application Priority Data

Aug. 29, 2014 (CN) .......................... 2014 1 0438109

(51) Int. Cl.
*G06F 15/16* (2006.01)
*G06F 3/14* (2006.01)
*H04L 29/06* (2006.01)

(52) U.S. Cl.
CPC ............ *G06F 3/1423* (2013.01); *H04L 67/38* (2013.01)

(58) Field of Classification Search
CPC ......... H04L 29/08; H04L 67/38; H04L 67/06; G06F 3/14; G06F 3/1423; G06T 11/20
See application file for complete search history.

(56) References Cited

U.S. PATENT DOCUMENTS

| 8,050,502 | B2 | 11/2011 | Sato |
| 8,469,269 | B2 | 6/2013 | Daily |
| 8,532,299 | B2 | 9/2013 | Hara |
| 8,827,160 | B1 | 9/2014 | Pascal |
| 8,967,470 | B2 | 3/2015 | Sekiya |
| 9,264,480 | B1 | 2/2016 | Saylor |
| 2001/0054008 | A1 | 12/2001 | Miller |
| 2006/0237547 | A1 | 10/2006 | Barenburg |
| 2006/0265731 | A1 | 11/2006 | Matsuda |
| 2009/0172780 | A1 | 7/2009 | Sukeda |
| 2012/0138671 | A1 | 6/2012 | Gaede |
| 2013/0048723 | A1 | 2/2013 | King |
| 2013/0075464 | A1 | 3/2013 | Van Horn |
| 2013/0193200 | A1 | 8/2013 | O'Connor |
| 2013/0221091 | A1 | 8/2013 | Koo |
| 2013/0275192 | A1 | 10/2013 | Aissa |
| 2014/0025519 | A1 | 1/2014 | Thomas |

(Continued)

FOREIGN PATENT DOCUMENTS

| CN | 200959212 | 10/2007 |
| CN | 203165017 | 8/2013 |

(Continued)

*Primary Examiner* — Benjamin M Thieu
(74) *Attorney, Agent, or Firm* — Van Pelt, Yi & James LLP

(57) ABSTRACT

Presenting information includes receiving two-dimensional code information sent by a server, supplying power to the client device, displaying, using the first display, two-dimensional code images corresponding to the received two-dimensional code information, and controlling the displaying of the two-dimensional code images in the first display.

18 Claims, 11 Drawing Sheets

(56) References Cited

U.S. PATENT DOCUMENTS

| | | |
|---|---|---|
| 2014/0067426 A1 | 3/2014 | Neff |
| 2014/0110468 A1 | 4/2014 | Kandregula |
| 2014/0278906 A1 | 9/2014 | Sullivan |
| 2017/0064514 A1 | 3/2017 | Alles |

FOREIGN PATENT DOCUMENTS

| | | |
|---|---|---|
| CN | 103544595 | 1/2014 |
| CN | 103971605 | 8/2014 |
| JP | 2003052072 | 2/2003 |
| JP | 2005332035 | 12/2005 |
| JP | 2007241527 | 9/2007 |
| JP | 2009151699 | 7/2009 |
| JP | 2011138367 | 7/2011 |
| JP | 2012085240 | 4/2012 |
| JP | 2014017581 | 1/2014 |

100

1100

300

500

900

METHOD AND SYSTEM FOR PRESENTING INFORMATION

CROSS REFERENCE TO OTHER APPLICATIONS

This application is a continuation of co-pending U.S. patent application Ser. No. 14/833,473, entitled METHOD AND SYSTEM FOR PRESENTING INFORMATION filed Aug. 24, 2015, which claims priority to People's Republic of China Patent Application No. 201410438109.3, entitled A METHOD, A CLIENT, A SERVER, AND A SYSTEM FOR PRESENTING INFORMATION, filed Aug. 29, 2014 both of which are incorporated herein by reference for all purposes.

FIELD OF THE INVENTION

The present application relates to a method and a system for presenting information.

BACKGROUND OF THE INVENTION

As technology progresses, people have more ways to acquire information. Various ways of acquiring information, including scanning two-dimensional code (quick response (QR) code or two-dimensional code) images, have become increasingly popular. Two-dimensional codes typically provide the following benefits: large information capacity, broad range of coding, robust error tolerance, high speed of capture and recognition, high level of confidentiality, etc. Two-dimensional codes have applications in social messaging, information promotion, and various other industries.

Typically, two-dimensional codes include two-dimensional barcodes (or stacked linear barcodes) and matrix-type two-dimensional codes. Two-dimensional codes can be symbolic information that uses an image including a specific geometric shape distributed based on a certain pattern on a plane (in two dimensions) in black and white to record data. For example, in applications that use two-dimensional codes to present product information, a link information code for an online product can be coded as two-dimensional code information. The two-dimensional code information is converted by two-dimensional code-generating software into a corresponding two-dimensional code image. The two-dimensional code image can be displayed in fliers, newspapers, and posters. A user can scan the two-dimensional code image using a mobile terminal and thereby link to an online target object, acquire promotional information relating to the target object, and receive instructions to access the target object online. Thus, the user can access online information using an offline two-dimensional code.

However, conventionally, the usual way of presenting target object information using a two-dimensional code is to present the two-dimensional code on a paper medium. As a result of the printing and layout limitations of paper, two-dimensional code information appearing on the paper media cannot be promptly updated. Also, the correspondingly presented target object information or other information is difficult to be promptly updated or remain synchronized with online activities. When the two-dimensional code presentation is to be updated, typically new paper media is to be issued. This technique not only wastes paper resources, but also involves a long information updating cycle. Accordingly, the technique wastes both time and effort.

BRIEF DESCRIPTION OF THE DRAWINGS

Various embodiments of the invention are disclosed in the following detailed description and the accompanying drawings.

DETAILED DESCRIPTION

Figure 1:
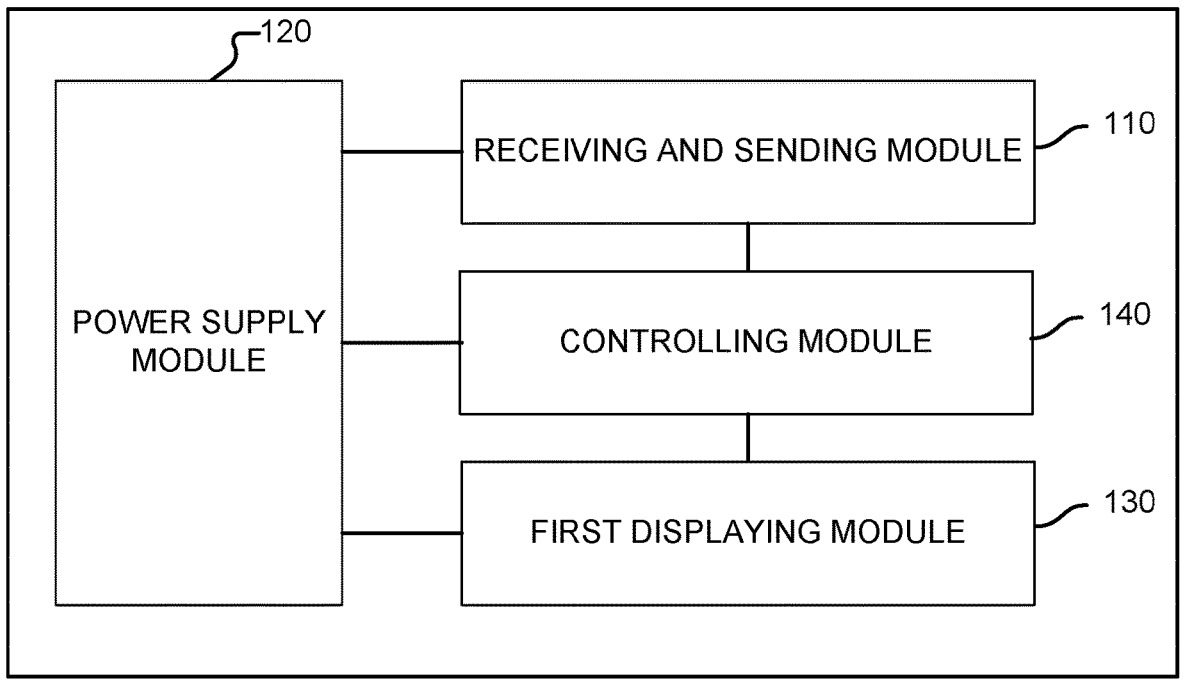
FIG. 1 is a modular structural diagram of an embodiment of a client for presenting information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As e-commerce develops, Online to Offline (O2O) transfer has become increasingly popular. This transfer typically refers to the use of online marketing and online purchases to drive offline operations and offline consumption. Some common approaches of the O2O transfer include discounts, providing promotional information, and service booking. For example, merchants' product information is pushed to Internet users who are converted into the merchants' offline customers. One of the important operations in the O2O transfer includes guiding users online and thereupon shifting the users from online to offline based on offline information presentation channels (including two-dimensional code images) and various offline promotional events, thus spurring offline sales. A client for presenting information is provided. Not only can the client present product two-dimensional code images and promptly update the presented two-dimensional code images, but also the two-dimensional code images can be integrated with a specific product and thus achieve synchronization with merchants' online product information. In some embodiments, the client for presenting information corresponds to a portable electronic tag that is placed next to promotional products and displays online event information of the promotional products.

FIG. 1 is a modular structural diagram of an embodiment of a client for presenting information. In some embodiments, the client 100 is configured to implement a process 1000 of FIG. 10 and comprises: a receiving and sending module 110, a power supply module 120, a first displaying module 130, and a controlling module 140. In some cases, client 100 can be placed next to a physical product displayed on a shelf.

In some embodiments, the receiving and sending module or communication interface 110 is configured to receive two-dimensional code information sent by a server.

The receiving and sending module 110 can include a wireline or wireless interface such as a radio-frequency device configured to receive messages sent by the server. In some embodiments, the messages include encoded two-dimensional code information relating to presented products, e.g., web page link addresses for products in a promotional event. In some embodiments, the receiving and sending module 110 is configured to receive, either wirelessly or by wire, a message sent by the server.

Figure 2:
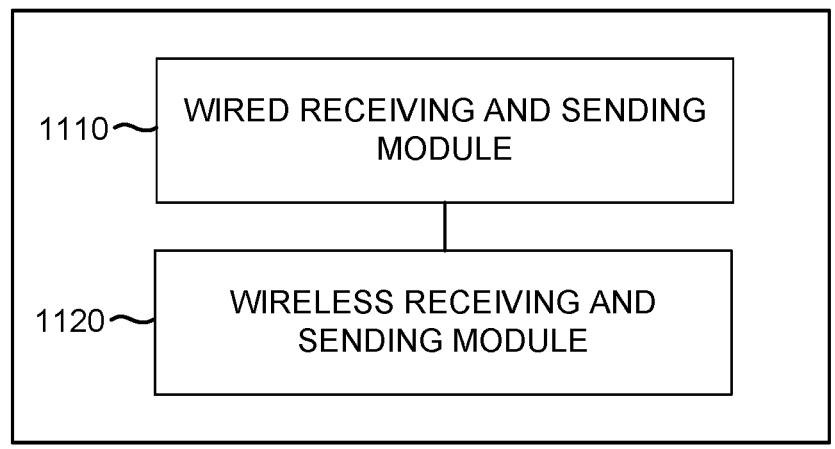
FIG. 2 is a modular structural diagram of an embodiment of a receiving and sending module.

FIG. 2 is a modular structural diagram of an embodiment of a receiving and sending module. In some embodiments, the receiving and sending module 1100 is an implementation of the receiving and sending module 110 of FIG. 1 and comprises a wired receiving and sending module 1110 and/or a wireless receiving and sending module 1120.

In some embodiments, the wired receiving and sending module 1110 is configured to connect with a server through a wire line, and receive a message sent by the server.

In some embodiments, the wireless receiving and sending module 1120 is configured to connect with a server through a wireless communication network, and receive a message sent by the server.

For example, the wired receiving and sending module 1110 includes an Ethernet interface that is connected to a server through a wire line and configured to receive a message sent by the server. The wireless receiving and sending module 1120 includes a radio-frequency unit that uses wireless fidelity (WiFi), 3G/4G, Bluetooth, infrared, or other wireless communication networks to connect to a server and configured to receive a message sent by the server. Referring back to FIG. 1, clients 100 that are connected with the server through a wireless communication network can flexibly and conveniently present information in different locations such as shopping centers, counters, conference sites, and other presentation areas. The receiving and sending module 110 can include one or more of the wired receiving and sending module 1110 and the wireless receiving and sending module or wireless communication interface 1120. The receiving and sending module 110 can also include both the wired receiving and sending module or wired communication interface 1110 and the wireless receiving and sending module 1120.

In some embodiments, the receiving and sending module 110 connects with the server wirelessly or by wire to receive a message sent by the server, and is not limited to the receiving and sending module 110 being directly connected to the server. In some embodiments, the receiving and sending module 110 can also be indirectly connected with the server. For example, the wireless receiving and sending module 1120 of FIG. 2 can establish a connection with a router or a hub based on WiFi and then connect to a server through the router or hub by the wire line.

The message received by the receiving and sending module 110 can include the two-dimensional code information. The two-dimensional code can include link information that links to a page where a merchant presents its products. For example, a webpage relating to a product presented by a merchant can be a webpage for a skincare product that is being sold at a 50% discount for the day. The server can generate two-dimensional code information linking to the product page relating to this skincare product's 50% discount sale using existing library functions such as the PHP QR Code library, and send the two-dimensional code information via one or more data packets. The receiving and sending module 110 can receive the two-dimensional code information including a product page relating to the skincare product's 50% discount sale.

In some embodiments, the power supply module 120 is configured to supply power for the client 100. The power supply module 120 can include a device module that supplies power by accessing a power grid. The power supply module 120 can also include a general or specialized device for supplying power via a dry cell or storage battery. A power supply modular structure which, for example, simultaneously includes a normal power supply from the power grid and a storage battery for backup power supply can also be employed.

In some embodiments, the first displaying module 130 is configured to display two-dimensional code images corresponding to the two-dimensional code information received by the receiving and sending module 110. The displayed two-dimensional code images can include different two-dimensional code images presented based on different two-dimensional code information received from the server. Flexibility and availability of the presentation information are increased with respect to those of ordinary paper two-dimensional code images. In various application scenarios, displaying modules can correspond with different display equipment. The displaying modules can include electronic display screens or electronic tags. The electronic display screens or electronic tags can include electronic display equipment such as a light-emitting diodes (LED) display, a liquid crystal display (LCD), etc. The electronic display screen includes evenly arranged rows and columns of display elements (e.g., LED-based pixels), and exhibits specific pixels as lit or unlit on the electronic display screen based on the received information or can exhibit different colors of pixels, to display a two-dimensional code image corresponding to the two-dimensional code information.

In some embodiments, the controlling module 140 is configured to control the display of the two-dimensional code images in the first displaying module 130. The controlling module 140 processes the two-dimensional code information received by the receiving and sending module 110 and controls the display of the two-dimensional code information in the two-dimensional code images in the first displaying module 130. For example, the two-dimensional code information received by the receiving and sending module 110 can be in a predetermined format which is a JavaScript Object Notation (JSON) data format. The controlling module 140 acquires the corresponding two-dimensional code information corresponding with data structure rules of the JSON data format of a predetermined format. The controlling module 140 converts the two-dimensional code information to an information format which the first displaying module 130 can recognize and then sends the two-dimensional code information to the first displaying module 130. The controlling module 140 can control the display of the two-dimensional code information through the displaying module 130. In an example, the controlling module 140 receives the two-dimensional code image corresponding to the two-dimensional code information and controls its display position in the first displaying module 130, its display color and brightness, its display duration, etc. The controlling module 140 can control the display by the first displaying module 130 of black-and-white two-dimensional code images. In some embodiments, the controlling module 140 can also control the display of the two-dimensional code images in colors other than black and white.

The client 100 can receive two-dimensional code information sent by a server and display the received two-dimensional code information in peripheral display equipment such as an electronic display screen. The client 100 can exhibit different two-dimensional code images based on different two-dimensional code information received from the server. Two-dimensional code information can be promptly updated when a product is sold out, a special offer event is modified, or product information changes. The two-dimensional code images can be dynamically and promptly updated.

Figure 3:
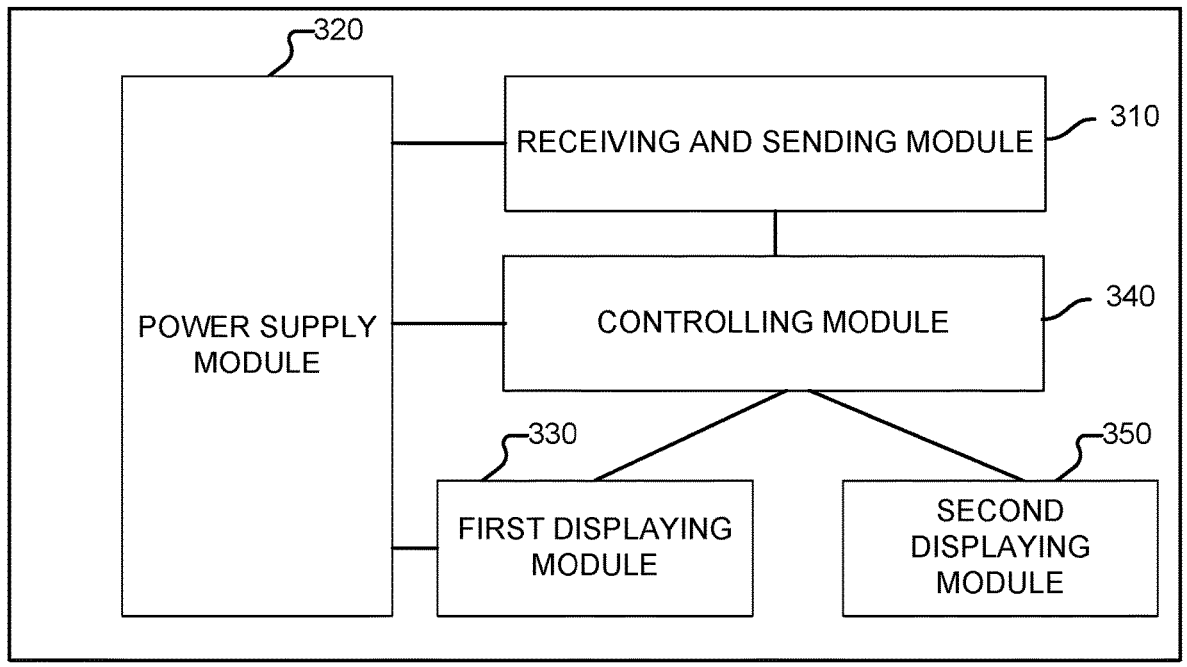
FIG. 3 is a modular structural diagram of another embodiment of a client for presenting information.

In some embodiments, to more effectively guide offline users in scanning two-dimensional images, client 300 of FIG. 3 is provided. FIG. 3 is a modular structural diagram of another embodiment of a client for presenting information. In some embodiments, the client 300 includes a receiving and sending module or communication interface 310, a power supply module 320, a first displaying module 330, and a controlling module 340, and further includes a second displaying module 350. In some cases, client 300 can be placed next to a physical product displayed on a shelf. For example, client 300 is attached to a dress sold in a mall by known means (e.g., a clip).

In some embodiments, the receiving and sending module 310, the power supply module 320, the first displaying module 330, and the controlling module 340 corresponds to the receiving and sending module 110, the power supply module 120, the first displaying module 130, and the controlling module 140 of FIG. 1, respectively.

In some embodiments, the second displaying module 350 is configured to display operating information for products corresponding to two-dimensional code images displayed by the first displaying module 330.

Correspondingly, the receiving and sending module 310 is further configured to receive operating information sent by a server, and the controlling module 340 is further configured to control the displaying of the operating information on the second displaying module 350.

In some embodiments, the operating information includes text, symbols, product price information, promotional information, purchasing information, advertising, and other such information that can enable users to visually grasp the product exhibited by the two-dimensional code information-exhibiting client 300. For example, the second displaying module 350 can exhibit the text corresponding to a product's promotional information, such as "This style is being offered at a 50% discount," "Same style online, $49," "Scan a code to enter prize drawing! 100 names drawn daily," etc. With the second displaying module 350, the user can, through the client 300, gain a real-time, intuitive understanding of special offers, promotions, drawings, group purchases, and other such information related to the presented products. Because the user gets extra information about the products while he/she is browsing for physical products, the user will more likely participate in the presented product event. In addition, the client 300 provides benefits in actual application scenarios. In other words, by presenting operating information on the client 300, maintaining information synchronization with online event products is possible. The operating information can include corresponding online product real-time information. For example, a server can present price information, purchasing information, promotional information, and other such product-related operating information that is presented on an online page client browser and likewise present the information on a client in real time and thus achieve synchronized online/offline updating of the product operating information. For example, in an application scenario, a product is being sold online for a limited time at a discount. The server can present the product's promotional information ("Same style online, $49") in the corresponding online product page. At the same time, the server can send the product's promotional information to the client 300 in a brick-and-mortar shop. The client 300 presents the production promotional information "Same style online, $49" offline (e.g., displaying the production promotional information on the shelf displaying the physical product). The client 300 thus achieves information synchronization of the product in online and offline events. The server can generate corresponding operating information on an online page. At the same time, the server can also send additional special offer information to the client 300 of the brick-and-mortar shop. The client 300 can update the original operating information "Same style online, $49" to "Same style online for $49, $29 off immediately for purchases of $100 or more." Thus, in addition to the promotional price of $49 for the product, $29 is subtracted from purchases of at least 100 dollars. In this way, the offline client 300 can achieve information synchronization in real time with offline products. A user shopping in a brick-and-mortar shop can acquire the latest product information and promotions in real time. Needs are matched quickly, and the user is accurately guided to purchase the product. The user can be drawn online by scanning the two-dimensional code on the client 300. Thus, the user is converted much more effectively from offline to online.

In some embodiments, the first displaying module 330 and the second displaying module 350 can correspond to different display devices separately displaying the two-dimensional code image and the operating information. As an example, two electronic display screens are used to separately display a product's two-dimensional code image and the product's associated promotional and special offer information. In some embodiments, the first displaying module 330 and the second displaying module 350 can be the same display device partitioned into different display modules based on the display content of different display areas. As an example, a left half of an electronic display screen presents a product's two-dimensional code image (first displaying module 330), while a right half presents promotional and special offer information (second displaying module 350). In other words, the first displaying module 330 and the second displaying module 350 can jointly use the same displaying device hardware.

In some embodiments, the client 300 is provided. The client 300 includes a receiving and sending module 310 further configured to receive interactive messages from a server. Correspondingly, the controlling module 340 can send an interactive message to the first displaying module 330, the second displaying module 350, or a combination thereof. The first displaying module 330, the second displaying module 350, or a combination thereof can display the interactive message.

In some embodiments, the received interactive messages include interactive messages sent by a server to clients based on user behavior and integrated with product information, promotional information, and other such information. For example, when a user scans a two-dimensional code image using a device such as a smartphone or tablet, the two-dimensional code is decoded by a scanning application and one or more links to the corresponding page are obtained. The user may select the links using a browser or application. Thus, the receiving and sending module 310 can receive an interactive message relating to, for example, "Thank you for your interest!" or "You are the 24th customer to pre-order this product. Just 6 more people for a group purchase!" The interactive messages can include emotions, symbols, pictures, or other such information. For example, a smiley face emoticon message can be added at the end of a sent interactive message.

In some embodiments, the controlling module 340 can be further configured to, after the first displaying module 330, the second displaying module 350, or a combination thereof displays an interactive message for a predetermined length of time, display the information presented prior to the interactive message (e.g., the original QR code). The controlling module 340 can display the interactive message in the second displaying module 350 for a predetermined length of time. In some embodiments, the interactive message can be displayed in the first displaying module 330 for a predetermined length of time. After the first displaying module 330 or second displaying module 350 displays the interactive message for a predetermined length of time, the interactive message can continue to display the original two-dimensional code image or operating information. For example, in an application scenario, the controlling module 340 can, after the user has scanned the two-dimensional code image, take the operating information "This style is discounted by 30% with a 30-person purchasing group!" which is displayed by the second displaying module 350 corresponding to the interactive message received by the receiving and sending module 310 and instead display "You are the 25th customer to pre-order this product. 5 more to go for a purchasing group!" Moreover, the interactive message can maintain the display for the predetermined length of time of 10 seconds. Then, the second displaying module 350 can continue to display the previous operating information: "This style is discounted 30% with a 30-person purchasing group!"

The client 300 can receive an interactive message sent by a server and form real-time interactions with a user at the front end. This client 300 can increase user interest in participating in events that present product information. This client 300 can increase the number of users that are actually drawn from offline to online and can promote the development of O2O e-commerce.

Figure 4:
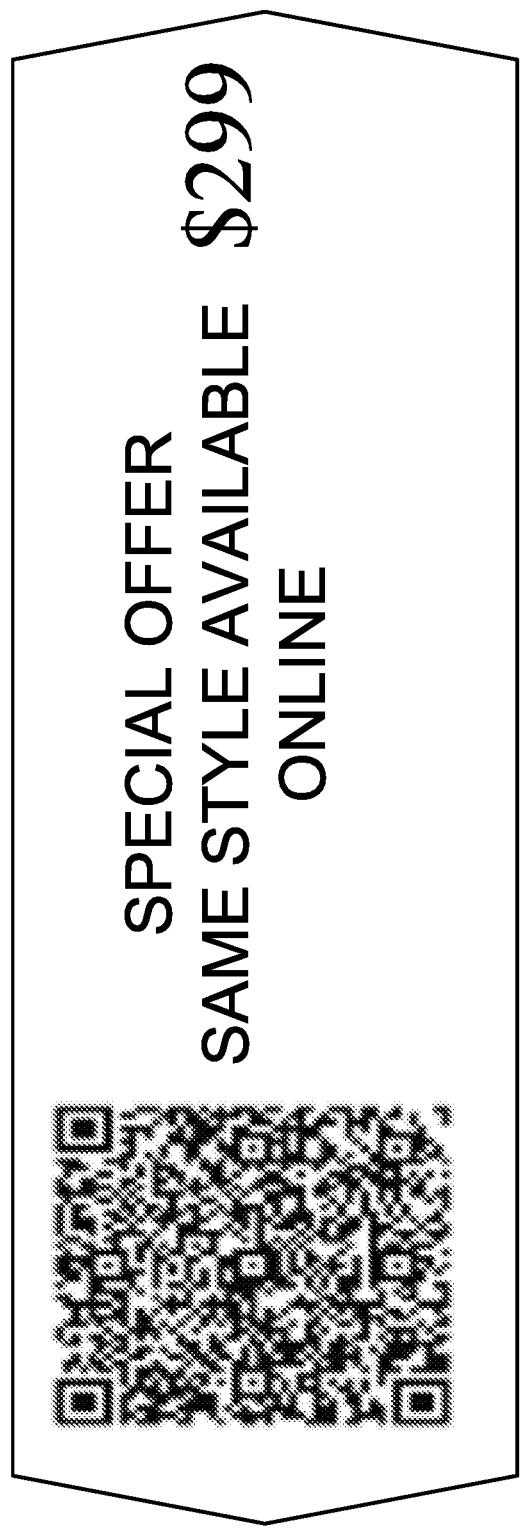
FIG. 4 is a diagram of an example of presented product information.

FIG. 4 is a diagram of an example of presented product information. The client can present a two-dimensional code image of a product on the left side of the electronic display screen of the display presenting module based on received two-dimensional code information from the server and update the two-dimensional image in real time. Unlike with conventional paper media, this client provides the ability to update two-dimensional images in real time. The client can also dynamically present operating information for the product information. Examples of the operating information include prices, discounts, and other operating information relating to the presented product. Moreover, the operating information of the online server can be synchronized in real time, which allows the acquisition of the latest product information through direct perception for users. Furthermore, the client can further present interactive messages that are associated with or correspond to user actions and that interact with users in real time. This client makes the user's experience of participating in the product presenting event more enjoyable and increases user satisfaction.

Figure 5:
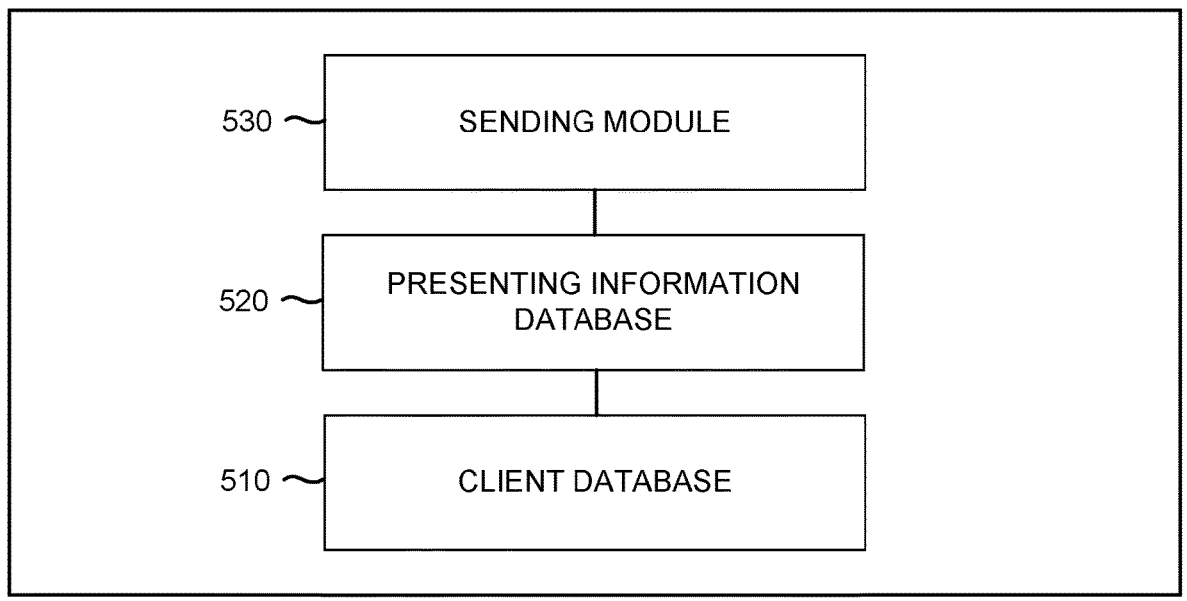
FIG. 5 is a modular structural diagram of an embodiment of a server for presenting information.

A server for presenting information is provided. The server can manage the client and maintain correspondences between the clients and information presented by the clients. In addition, the server can perform communications and information exchanges with the clients. FIG. 5 is a modular structural diagram of an embodiment of a server for presenting information. In some embodiments, the server 500 is configured to implement the process 1000 of FIG. 10 and comprises: a client database 510, a presenting information database 520, and a sending module 530.

In some embodiments, the client database 510 is configured to store communication addresses of clients for presenting information. The communication addresses can include IP addresses, MAC addresses, or other such addresses that indicate the addresses of the clients for presenting information. The communication addresses can also include other identifier information, such as port numbers especially set up for different communication addresses, which are used by the clients for presenting information and that can label these clients for presenting information. The server for presenting information can send two-dimensional code information to the clients based on the communication addresses of the clients. In some embodiments, the client database 510 can be further configured to store other information associated with the clients, e.g., physical locations, operating statuses, etc. of the clients. The database information can be preconfigured; for example, when clients are deployed for a merchant's brick-and-mortar store.

In some embodiments, the presenting information database 520 is configured to store the two-dimensional code information generated for clients. The two-dimensional code information can include two-dimensional code information linked to pages for products presented by the clients. For example, a program can be implemented on a server, which receives product discounting and promotional page information for various products, to generate the two-dimensional code information that links to product discounting and promotional pages based on discount and promotional information of the presented product. Moreover, the server can store the two-dimensional code information. In addition, the server can store other information related to the presented product, e.g., the current number of product buyers, random codes usable for other drawing events that are generated following purchase of the product, etc. In some embodiments, the two-dimensional code information, such as a QR code, a bar code, etc., corresponds to two-dimensional code image information generated based on the presented product information. In some embodiments, the sending unit 530 is configured to send the two-dimensional code image information for the product. In some embodiments, the two-dimensional code information can also be two-dimensional code information generated based on the presented product information. Correspondingly, the sending unit 530 can send the two-dimensional code information for the product, and the clients can receive the two-dimensional code information and then generate two-dimensional code images corresponding to the two-dimensional code information.

In some embodiments, the presenting information database 520 is configured to store correspondences between the clients and the two-dimensional code information. The correspondences between the clients and the two-dimensional code information that are stored by the presenting information database 520 can include correspondences between client communication addresses and the two-dimensional code information, or correspondences between client identifiers and the two-dimensional code information. Table 1 below is an example of a table of correspondences between clients and two-dimensional code information.

| Client serial number | Communication address | Two-dimensional code information |
|---|---|---|
| A_NUM_001 | 92.168.10.1 | http://example.com/ha1 (Household Appliance 1 promotional link page) |
| A_NUM_002 | 92.168.10.2 | http://example.com/ha2 (Household Appliance 2 promotional link page) |
| A_NUM_003 | 92.168.10.3 | http://example.com/ha3 (Household Appliance 3 promotional link page) |
| A_NUM_004 | 92.168.10.4 | http://example.com/ha4 (Household Appliance 4 promotional link page) |
| B_NUM_001 | 92.168.20.1 | http://example.com/gp (Group purchase link page) |
| B_NUM_002 | 92.168.20.2 | http://example.com/prize (Link page for code-scan prize drawing) |
| B_NUM_003 | 92.168.20.3 | http://example.com/bf (Black Friday pre-order link page) |
| B_NUM_004 | 92.168.20.4 | http://example.com/reg (Member registration link page) |

In some embodiments, the sending module 530 is configured to send two-dimensional code information to the clients based on the communication addresses of the clients and the correspondences between the clients and the two-dimensional code information stored by the presenting information database 520.

The correspondences between the clients and the two-dimensional code information stored in the client database 510 and the presenting information database 520 in a server can be added, deleted, modified, or undergo other operation based on changes in client communication addresses or changes in product information. For example, the sending module 530 sends two-dimensional code information to different clients based on the correspondence table. For example, when the purchasing group event for the first product is presented by the client whose client serial number is "B_NUM_001" and whose communication address is "192.168.20.1," the presenting information database 520 generates two-dimensional code information for a second product group purchasing event, and the client corresponds in the correspondence table to the one with client serial number "B_NUM_001" and communication address "192.168.20.1". The sending module 530 is configured to, based on the "192.168.20.1" communication address of the client, send the two-dimensional code information of the second product to the client whose client serial number is "B_NUM_001."

In another embodiment of a client, a module for the correspondence table can be independently set up and maintained and used to update the two-dimensional code information corresponding to the clients. The basic concept thereof does not depart from the following scope described by the present application: a server includes correspondences between clients and presented information, and these correspondences can undergo addition, deletion, and revision based on product information, client information, and other such information. A server sends two-dimensional code information to various clients based on the correspondences between the clients and the presented information. The two-dimensional code information is displayed on the client display device upon reception. When the two-dimensional code information changes, updated two-dimensional code information can be promptly sent to clients. The clients' two-dimensional code images can be quickly, accurately, and promptly updated. The updating of the information displayed by the clients can be completed, thus increasing the efficiency with which information is presented by the clients.

Figure 6:
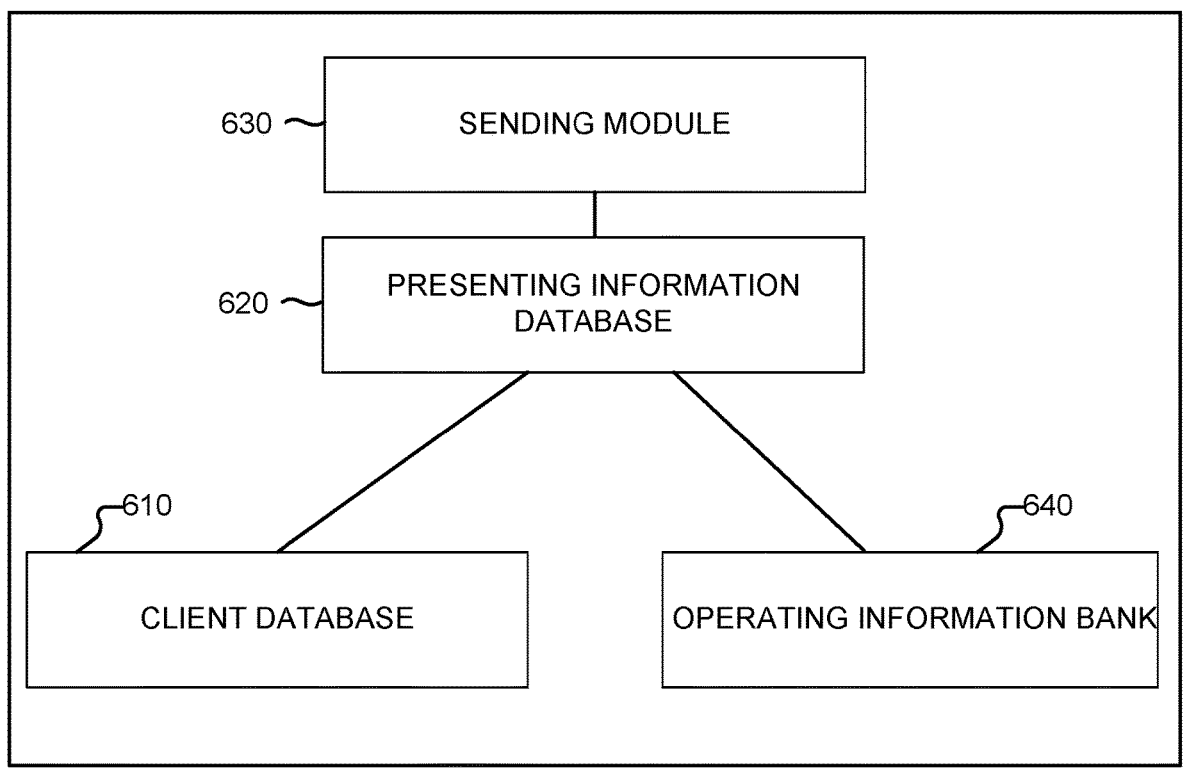
FIG. 6 is a modular structural diagram of another embodiment of a server for presenting information.

FIG. 6 is a modular structural diagram of another embodiment of a server for presenting information. In some embodiments, the server 600 comprises: a client database 610, a presenting information database 620, a sending module 630, and an operating information bank 640.

In some embodiments, the client database 610, the presenting information database 620, and the sending module 630 correspond to the client database 510, the presenting information database 520, and the sending module 530 of FIG. 5, respectively.

In some embodiments, the operating information bank 640 is configured to store product operating information. Correspondingly, the presenting information database 620 is configured to store correspondences between the clients and the operating information, and the sending module 630 is configured to send operating information to the clients based on the communication addresses of the clients and the correspondences between the clients and the operating information.

Table 2 below is an example of a table including correspondences between the clients and the operating information that are stored in the presenting information database 620. As shown in Table 2 below, the server can send different operating information to different clients. The operating information can be added, deleted, or revised based on changes in product information.

TABLE 2

Correspondences between clients and operating information

| Client serial number | Communication address | Two-dimensional code information | Operating information |
|---|---|---|---|
| A_NUM_001 | 192.168.10.1 | http://example.com/ha1 (Household Appliance 1 promotional link page) | Household Appliance 1 20% discount |
| A_NUM_002 | 192.168.10.2 | http://example.com/ha2 (Household Appliance 2 promotional link page) | Household Appliance 2 20% discount |
| A_NUM_003 | 192.168.10.3 | http://example.com/ha3 (Household Appliance 3 promotional link page) | Household Appliance 3 40% discount |
| A_NUM_004 | 192.168.10.4 | http://example.com/ha4 (Household Appliance 4 promotional link page) | Household Appliance 4 online 30% discount |
| B_NUM_001 | 192.168.20.1 | http://example.com/gp (Group purchase link page) | Online 50% discount for group purchase of this style, 30 persons qualifies as group |
| B_NUM_002 | 192.168.20.2 | http://example.com/prize (Link page for code-scan prize drawing) | Scan me to take part in prize drawing, 100% prize-winning rate |
| B_NUM_003 | 192.168.20.3 | http://example.com/bf (Black Friday pre-order link page) | 50% discount on pre-orders of this style until September 30 |
| B_NUM_004 | 192.168.20.4 | http://example.com/reg (Member registration link page) | Register for rebate, minimum rebate of 10 dollars coupon |

The operating information can include textual introductory information that is for presenting introductions of the product corresponding to the two-dimensional code image on clients. In some embodiments, the server not only sends two-dimensional code information to the clients, but also can simultaneously send operating information for the presented product of the clients. The receiving of the operating information can cause the clients to display textual introductory information for the presented product so that users can intuitively and quickly grasp the product event information.

Figure 7:
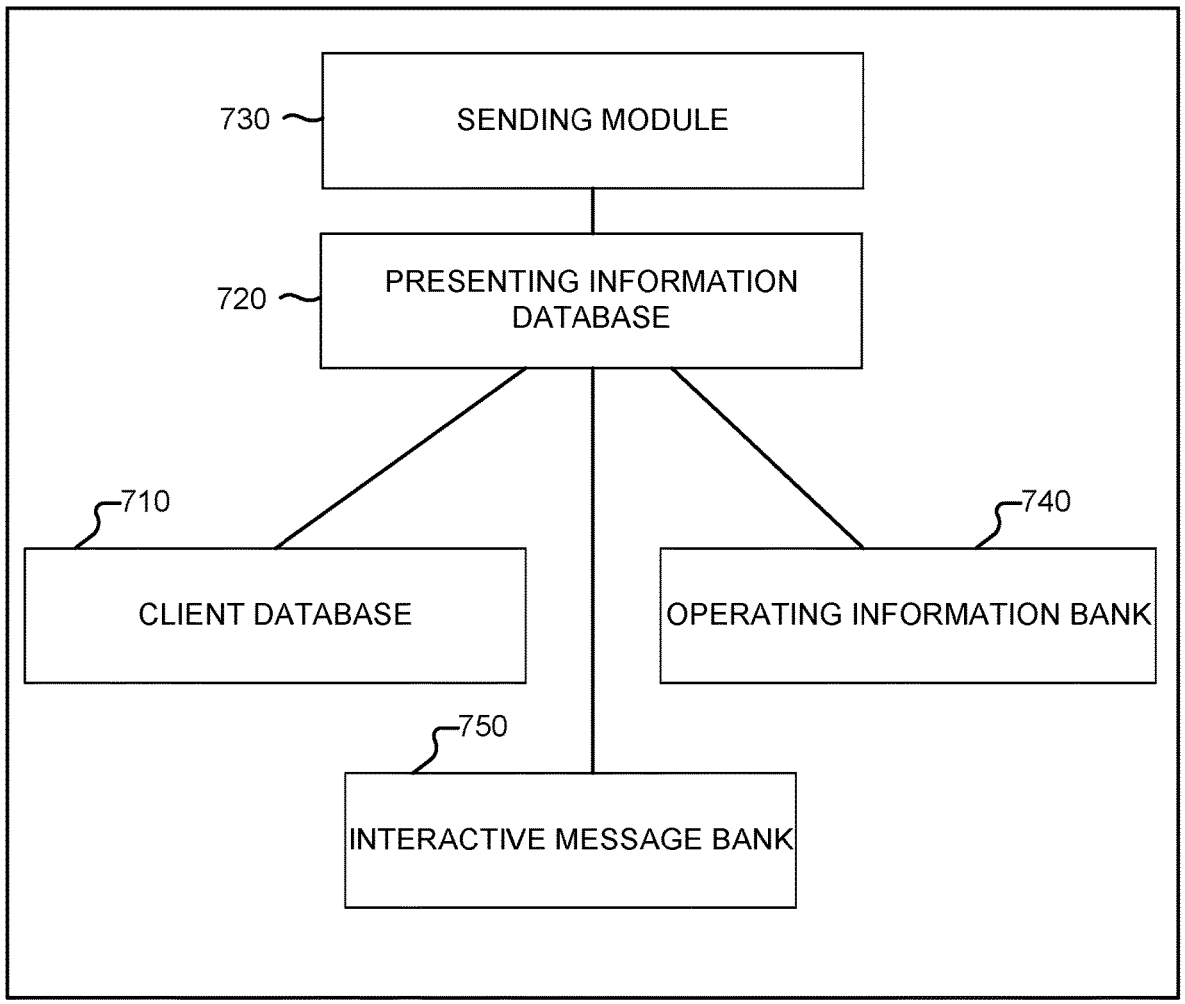
FIG. 7 is a modular structural diagram of another embodiment of a server for presenting information.

FIG. 7 is a modular structural diagram of another embodiment of a server for presenting information. In some embodiments, the server 700 comprises: a client database 710, a presenting information database 720, a sending module 730, an operating information bank 740, and an interactive message bank 750.

In some embodiments, the client database 710, the presenting information database 720, the sending module 730, and the operating information bank 740 correspond to the client database 610, the presenting information database 620, the sending module 630, and the operating information bank 640 of FIG. 6, respectively.

In some embodiments, the interactive message bank 750 is configured to store interactive messages.

In some embodiments, correspondingly, the presenting information database 720 is configured to store correspondences between the clients and the interactive messages, and the sending module 730 is configured to send, when a preset trigger condition is satisfied, the interactive messages to the clients based on the communication addresses of the clients and the correspondences between the clients and the interactive messages.

The preset trigger condition can include a determination condition that was set in advance and that is used to determine whether to send an interactive message. For example, the trigger condition can include detecting that a user has scanned the two-dimensional code image of a client and linked to a product page via the two-dimensional code information. The server can be triggered to send an interactive message to clients that were scanned by users. For example, the server can send the interactive message "Thank you for your interest!" Interactive messages can include information formed based on data acquired from other data modules of the server or other services. For example, a website server for user scanning and pre-purchasing can send to the server information based on the user being the 24th user in the current group purchase, and the server can send the interactive message "You are the 24th customer to pre-purchase this product. Just 6 more and the group purchase can be made!" based on the information sent by the website server.

The server 700 can send interactive messages to clients and form real-time interactions with users at the front end. The sending of the interactive messages to the clients can increase user interest in participating in events that present product information, can increase satisfaction with user participation experiences, and increase the number of users that convert from offline to online.

Figure 8:
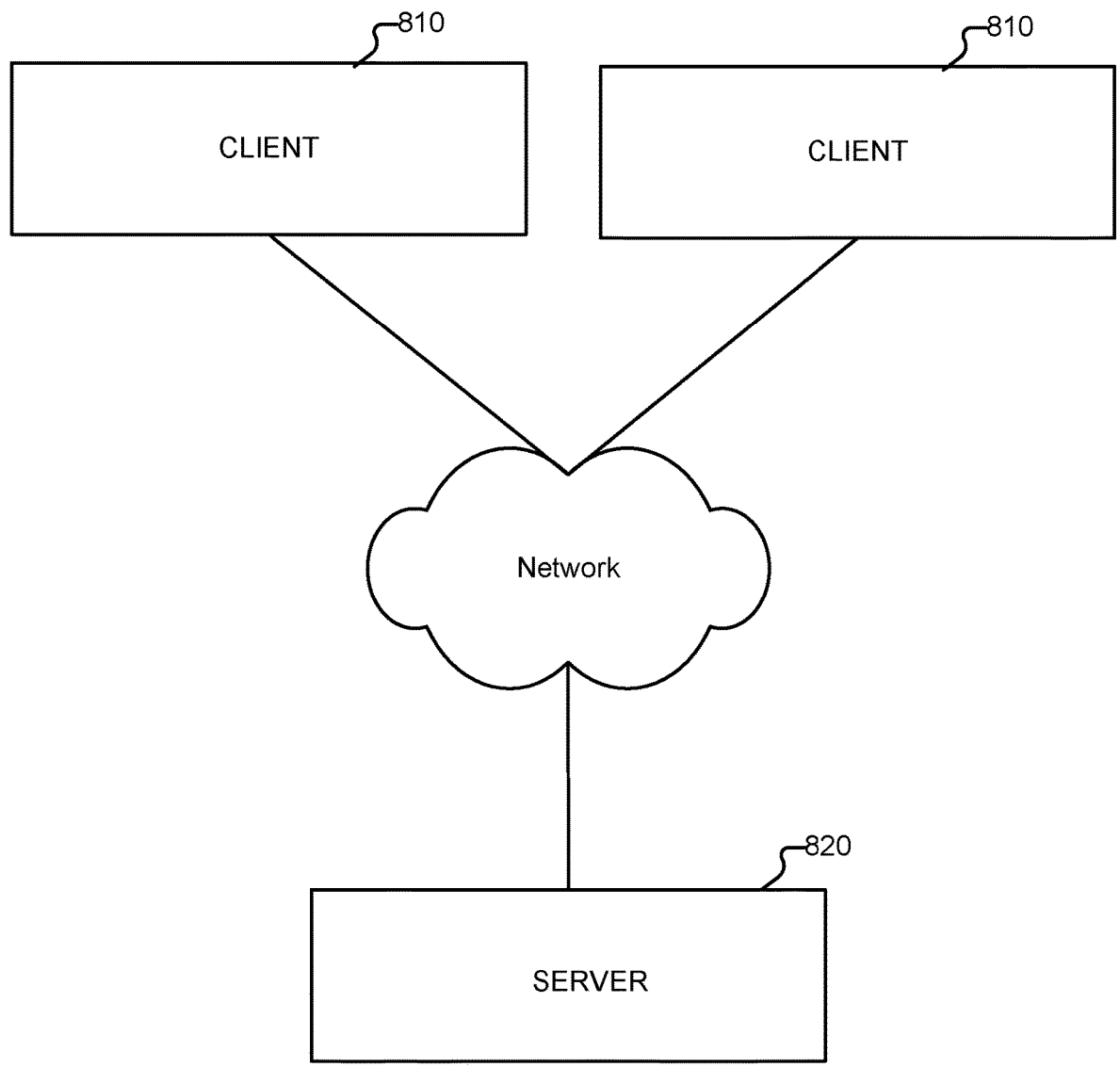
FIG. 8 is a modular structural diagram of an embodiment of a system for presenting information.

FIG. 8 is a modular structural diagram of an embodiment of a system for presenting information. In some embodiments, the system 800 includes clients 810 for presenting information and a server 820 for presenting information.

In some embodiments, the clients 810 are configured to receive two-dimensional code information sent by a server, and display two-dimensional code images corresponding to the received two-dimensional code information.

In some embodiments, the server 820 is configured to store communication addresses of the clients 810, generate and store two-dimensional code information, store correspondences between the clients and the two-dimensional code information, and send the two-dimensional code information to the clients based on the communication addresses of the clients and the correspondences between the clients and the two-dimensional code information.

In some embodiments, the server 820 is configured to store operating information and correspondences between the clients 810 and the operating information, and send the operating information to the clients 810 based on the stored communication addresses of the clients 810 and the correspondences between the clients 810 and the operating information.

In some embodiments, correspondingly, the clients 810 are configured to receive the operating information and display the operating information in displaying modules of the clients 810.

In some embodiments, the server 820 is configured to store interactive messages and correspondences between the clients 810 and the interactive messages, and send the interactive messages to the clients 810 based on the stored communication addresses of the clients 810 and the correspondences between the clients 810 and the interactive messages.

In some embodiments, correspondingly, the clients 810 are configured to receive the interactive messages and display the interactive messages in the displaying modules of the clients 810.

The system 800 includes the following: the clients 810 are configured to dynamically display product two-dimensional code information, and the server 820 is configured to, when the server 820 updates online product information, send updated two-dimensional code information, operating information, and other such information to clients in brick-and-mortar shops. The clients can promptly and accurately display the two-dimensional images and the operating information. Not only does the system 800 conserve paper resources, but also the system 800 can increase the efficiency of brick-and-mortar shop presentations, guide users to online consumption, increase offline-to-online conversion rates, and achieve more satisfactory results in attracting and guiding customers.

Figure 9:
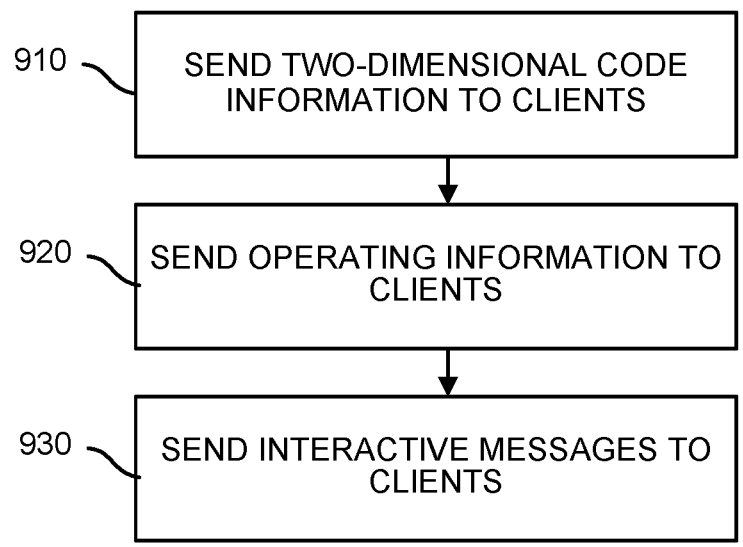
FIG. 9 is a flowchart of an embodiment of a process for presenting information.

FIG. 9 is a flowchart of an embodiment of a process for presenting information. In some embodiments, the process 900 is performed by the server 820 of FIG. 8 and comprises:

In 910, the server sends two-dimensional code information to clients based on stored communication addresses of the clients and correspondences between the clients and the two-dimensional code information.

In some embodiments, the clients receive the two-dimensional code information and convert the two-dimensional code information into corresponding two-dimensional code images.

The server prestores operating information and correspondences between the clients and the operating information.

In 920, the server sends the operating information to the clients based on the communication addresses of the clients and correspondences between the clients and the operating information.

Correspondingly, the clients can receive the operating information and display the operating information.

The server prestores interactive messages and correspondences between the clients and the interactive messages.

In 930, the server sends interactive messages to the clients based on the communication addresses of the clients and the correspondences between the clients and the interactive messages.

Correspondingly, the clients are configured to receive the interactive messages and display the interactive messages.

Figure 10:
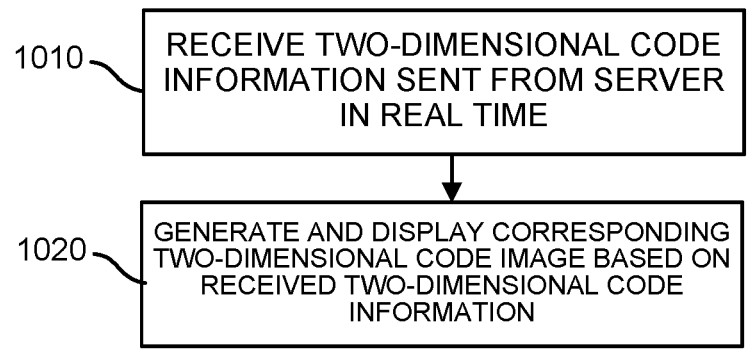
FIG. 10 is a flowchart of another embodiment of a process for presenting information.

FIG. 10 is a flowchart of another embodiment of a process for presenting information. In some embodiments, the process 1000 is performed by a client 810 of FIG. 8 and comprises:

In 1010, the client receives two-dimensional code information sent from a server in real time.

In 1020, the client generates and displays a corresponding two-dimensional code image based on the received two-dimensional code information. The two-dimensional code information presented by the client can be promptly updated.

In some embodiments, clients correspond to portable electronic devices such as small electronic tags that are presented together with the presented product or information-presenting electronic signs. A portable electronic device having a communication connection with a server is provided.

In some embodiments, the portable electronic device is configured to be attached (e.g., by a clip) to a first offline item and attached to a second offline item. In some embodiments, the portable electronic device includes a display screen. Because the first and second offline items can be removed from the portable electronic device, this means that the portable electronic device can be attached to other offline items.

In some embodiments, the display screen is configured to display, when the portable electronic device is joined with the first item, a first two-dimensional code image relating to the first item and being pushed by a server. The first two-dimensional code image is scannable by a scanning device to acquire first item information relating online to the first item.

In some embodiments, the display screen is further configured to display, when the portable electronic device is joined with a second item, a second two-dimensional code image relating to the second item and being pushed by a server. The second two-dimensional code image is scannable by a scanning device to acquire second item information relating online to the second item.

The above first item and second item can be understood as pointing to a plurality of offline items. In some embodiments, any combination of a third item, a fourth item, and other items can be displayed as corresponding a third two-dimensional code image, a fourth two-dimensional code image, and other two-dimensional code images. For example, an actual product presentation can include 100 items, one item of which can be regarded as the first item and another item can correspondingly be regarded as the second item.

In some embodiments, the display screen is further configured to display, when connected to the first item, first operating information relating to the first item and being pushed by the server.

In some embodiments, the display screen is further configured to display, when connected to the second item, second operating information relating to the second item and being pushed by the server.

In some embodiments, the display screen is further configured to display, when connected to the first item, a first interactive message relating to the first item and being pushed by the server.

In some embodiments, the display screen is further configured to display, when connected to the second item, a second interactive message relating to the second item and being pushed by the server.

As provided, clients can receive two-dimensional code information sent from a server in real time, generate corresponding two-dimensional code images, and promptly update the two-dimensional code information. In addition, the clients can also present promotional information for products, and synchronize the promotional information for the products with online products in real time so that users and customers can acquire product information intuitively, quickly, and accurately. Customers can be effectively guided towards participating in online events. In addition, the present application can also form interactive exchanges with users at the client and can increase satisfaction of the experience of users participating in events.

Figure 11:
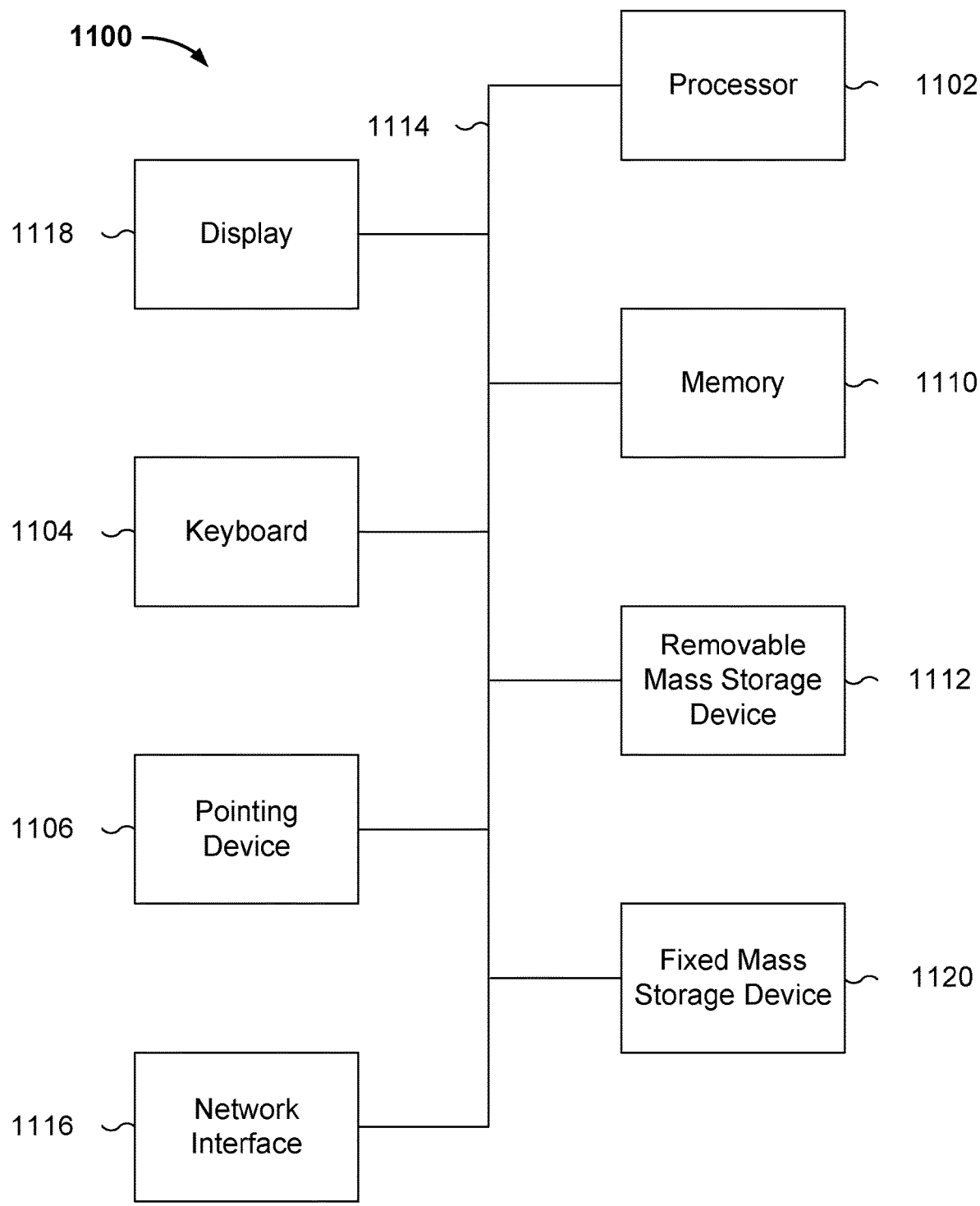
FIG. 11 is a functional diagram illustrating an embodiment of a programmed computer system for presenting information.

FIG. 11 is a functional diagram illustrating an embodiment of a programmed computer system for presenting information. As will be apparent, other computer system architectures and configurations can be used to present information. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118).

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data and objects used by the processor 1102 to perform its functions (e.g., programmed instructions). For example, memory 1110 can include any suitable computer-readable storage media, described below, depending on whether, for example, data access needs to be bi-directional or unidirectional. For example, processor 1102 can also directly and very rapidly retrieve and store frequently needed data in a cache memory (not shown).

A removable mass storage device 1112 provides additional data storage capacity for the computer system 1100, and is coupled either bi-directionally (read/write) or unidirectionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storages 1112, 1120 generally store additional programming instructions, data, and the like that typically are not in active use by the processor 1102. It will be appreciated that the information retained within mass storages 1112 and 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A client device, comprising:
a display configured to:
  display a two-dimensional code image;
  display operating information corresponding to the two-dimensional code image; and
  display an interactive message;
a communication interface configured to:
  receive two-dimensional code information sent by a server;
  receive the operating information sent by the server; and
  receive the interactive message sent by the server;
at least one processor coupled to the display, configured to:
  generate the two-dimensional code image corresponding to the received two-dimensional code information;
  control the displaying of the two-dimensional code image in the display;
  control the displaying of the operating information in the display; and
  output the interactive message to the display; and
a memory coupled to the at least one processor and configured to provide the at least one processor with instructions.

2. The client device as described in claim 1, wherein to display the interactive message comprises to:
display information presented prior to the displaying of the interactive message; and
display the interactive message for a predetermined length of time.

3. The client device as described in claim 1, wherein to receive the two-dimensional code information sent by the server comprises to:
connect with the server through a wire line, and receive, using the wire line, a message sent by the server; or
connect with the server through a wireless communication network, and receive, using the wireless communication network, a message sent by the server.

4. A system, comprising:
at least one processor configured to:
  store communication addresses of a plurality of clients in a client database;
  generate and store two-dimensional code information in a presenting information database;
  generate and store operating information in an operating information bank;
  generate and store interactive messages in the presenting information database;
  store correspondences between the plurality of clients and the two-dimensional code information in a correspondence bank; and
  store correspondences between the plurality of clients and the operating information in the correspondence bank;
a communication interface configured to:
  send the two-dimensional code information to the plurality of clients based on the communication addresses of the plurality of clients and the correspondences between the plurality of clients and the two-dimensional code information;
  send the operating information to the plurality of clients based on the communication addresses of the plurality of clients and the correspondences between the plurality of clients and the operating information; and
  send, when a preset trigger condition is satisfied, the interactive messages to the plurality of clients based on the communication addresses of the plurality of clients and the correspondences between the plurality of clients and the interactive messages; and
a memory coupled to the at least one processor and configured to provide the at least one processor with instructions.

5. The system as described in claim 4, wherein to send the two-dimensional code information to the plurality of clients comprises to:
connect with the plurality of clients through a wire line, and send, using the wire line, a message to the plurality of clients; or
connect with the plurality of clients through a wireless communication network, and send, using the wireless communication network, a message to the plurality of clients.

6. A system, comprising:
a plurality of clients, at least one client comprising:
  at least one processor coupled to a display, configured to:
    control displaying of operating information in the display; and
    output interactive message to the display;
  a communication interface configured to:
    receive two-dimensional code information sent by a server;
    receive the operating information sent by the server; and
    receive the interactive message sent by the server;
  the display screen configured to:
    display a two-dimensional code image corresponding to the received two-dimensional code information;
    display the operating information corresponding to the two-dimensional code image; and
    display the interactive message; and
  a memory coupled to the at least one processor and configured to provide the at least one processor with instructions; and
the server, comprising:
  at least one processor configured to:
    store communication addresses of the plurality of clients;
    generate and store two-dimensional code information;
    generate and store the operating information; and
    generate and store the interactive messages; and
    store correspondences between the plurality of clients and the two-dimensional code information;
  a communication interface configured to:
    send the two-dimensional code information to the plurality of clients based on the communication addresses of the plurality of clients and the correspondences between the plurality of clients and the two-dimensional code information;
    send the operating information to the plurality of clients based on the communication addresses of the plurality of clients and the correspondences between the plurality of clients and the operating information; and
    send, when a preset trigger condition is satisfied, the interactive messages to the plurality of clients based on the communication addresses of the plurality of clients and the correspondences between the plurality of clients and the interactive messages; and a memory coupled to the at least one processor and configured to provide the at least one processor with instructions.

7. The system as described in claim 6, wherein to display the interactive message comprises to:
display information presented prior to the displaying of the interactive message; and
display the interactive message for a predetermined length of time.

8. The system as described in claim 6, wherein to receive the two-dimensional code information sent by the server comprises to:
connect with the server through a wire line, and receive, using the wire line, a message sent by the server; or
connect with the server through a wireless communication network, and receive, using the wireless communication network, a message sent by the server.

9. The system as described in claim 6, wherein to send the two-dimensional code information to the plurality of clients comprises to:
connect with the plurality of clients through a wire line, and send, using the wire line, a message to the plurality of clients; or
connect with the plurality of clients through a wireless communication network, and send, using the wireless communication network, a message to the plurality of clients.

10. A method, comprising:
storing communication addresses of a plurality of clients in a client database;
generating and storing two-dimensional code information in a presenting information database;
generating and storing operating information in an operating information bank;
generating and storing interactive messages in the presenting information database;
storing correspondences between the plurality of clients and the two-dimensional code information in a correspondence bank;
storing correspondences between the plurality of clients and the operating information in the correspondence bank;
sending the two-dimensional code information to the plurality of clients based on the communication addresses of the clients and the correspondences between the clients and the two-dimensional code information;
sending the operating information to the plurality of clients based on the communication addresses of the plurality of clients and the correspondences between the plurality of clients and the operating information; and
sending, when a preset trigger condition is satisfied, the interactive messages to the plurality of clients based on the communication addresses of the plurality of clients and the correspondences between the plurality of clients and the interactive messages.

11. The method as described in claim 10, wherein the sending of the two-dimensional code information to the plurality of clients comprises:
connecting with the plurality of clients through a wire line, and sending, using the wire line, a message to the plurality of clients; or
connecting with the plurality of clients through a wireless communication network, and sending, using the wireless communication network, a message to the plurality of clients.

12. A portable electronic device, comprising:
at least one processor;
a communication interface;
a display screen configured to:
display, when the communication interface is attached to a first item, a first two-dimensional code image, first operating information, and a first interactive message relating to the first item and being pushed by a server, the first two-dimensional code image being scannable by a scanning device to acquire first item information relating online to the first item; and
display, when the communication interface is attached to a second item, a second two-dimensional code image, second operating information, and a second interactive message relating to the second item and being pushed by the server, the second two-dimensional code image being scannable by a scanning device to acquire second item information relating online to the second item; and
a memory coupled to the at least one processor and configured to provide the at least one processor with instructions.

13. The portable electronic device as described in claim 12, wherein to display the interactive message comprises to:
display information presented prior to the displaying of the interactive message; and
display the interactive message for a predetermined length of time.

14. A computer program product being embodied in a tangible non-transitory computer readable storage medium and comprising computer instructions for:
receiving two-dimensional code information sent by a server;
receiving operating information sent by the server;
receiving interactive message sent by the server;
displaying, using a display, a two-dimensional code image corresponding to the received two-dimensional code information;
displaying, using the display, operating information corresponding to the two-dimensional code image;
displaying, using the display, an interactive message;
controlling the displaying of the two-dimensional code image in the display;
controlling the displaying of the operating information in the display; and
outputting the interactive message to the display.

15. The computer program product as described in claim 14, wherein the displaying of the interactive message comprises:
displaying information presented prior to the displaying of the interactive message; and
displaying the interactive message for a predetermined length of time.

16. The computer program product as described in claim 14, wherein the receiving of the two-dimensional code information sent by the server comprises:
connecting with the server through a wire line, and receiving, using the wire line, a message sent by the server; or
connecting with the server through a wireless communication network, and receiving, using the wireless communication network, a message sent by the server.

17. A computer program product being embodied in a tangible non-transitory computer readable storage medium and comprising computer instructions for:
    storing communication addresses of a plurality of clients in a client database;
    generating and storing two-dimensional code information in a presenting information database;
    generating and storing operating information in an operating information bank;
    generating and storing interactive messages in the presenting information database;
    storing correspondences between the plurality of clients and the two-dimensional code information in a correspondence bank;
    storing correspondences between the plurality of clients and the operating information in the correspondence bank;
    sending the two-dimensional code information to the clients based on the communication addresses of the clients and the correspondences between the clients and the two-dimensional code information;
    sending the operating information to the plurality of clients based on the communication addresses of the plurality of clients and the correspondences between the plurality of clients and the operating information; and
    sending, when a preset trigger condition is satisfied, the interactive messages to the plurality of clients based on the communication addresses of the plurality of clients and the correspondences between the plurality of clients and the interactive messages.

18. The computer program product as described in claim 17, wherein the sending of the two-dimensional code information to the plurality of clients comprises:
    connecting with the plurality of clients through a wire line, and sending, using the wire line, a message to the plurality of clients; or
    connecting with the plurality of clients through a wireless communication network, and sending, using the wireless communication network, a message to the plurality of clients.

* * * * *